US008464264B2

(12) United States Patent
Sato

(10) Patent No.: US 8,464,264 B2
(45) Date of Patent: Jun. 11, 2013

(54) INFORMATION PROCESSING APPARATUS AND METHOD OF CONTROLLING SAME

(75) Inventor: Masaaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 12/718,688

(22) Filed: Mar. 5, 2010

(65) Prior Publication Data

US 2010/0235841 A1 Sep. 16, 2010

(30) Foreign Application Priority Data

Mar. 16, 2009 (JP) ................................ 2009-063232

(51) Int. Cl.
*G06F 9/46* (2006.01)
*G06F 9/455* (2006.01)

(52) U.S. Cl.
USPC ............................ 718/102; 718/100; 718/101

(58) Field of Classification Search
None
See application file for complete search history.

(56) References Cited

U.S. PATENT DOCUMENTS

| | | | | |
|---|---|---|---|---|
| 5,687,396 | A | 11/1997 | Satoh et al. | 395/872 |
| 5,710,921 | A * | 1/1998 | Hirose | 718/106 |
| 5,729,708 | A | 3/1998 | Satoh et al. | 395/250 |
| 5,848,271 | A | 12/1998 | Caruso et al. | 395/680 |
| 6,219,502 | B1 | 4/2001 | Osari et al. | 399/82 |
| 2002/0152254 | A1 * | 10/2002 | Teng | 709/100 |
| 2003/0233374 | A1 | 12/2003 | Spinola et al. | 707/104.1 |
| 2007/0008584 | A1 | 1/2007 | Kawabuchi et al. | 358/1.15 |
| 2008/0288621 | A1 | 11/2008 | Snell et al. | 709/223 |
| 2009/0037811 | A1 * | 2/2009 | Iwasaki | 715/271 |

FOREIGN PATENT DOCUMENTS

| | | | |
|---|---|---|---|
| CN | 101185088 | A | 5/2008 |
| CN | 101252676 | A | 8/2008 |
| EP | 1 760 588 | A1 | 3/2007 |
| EP | 1 936 494 | A1 | 6/2008 |
| JP | 7-319961 | A | 12/1995 |
| JP | 2003-203148 | A | 7/2003 |
| JP | 2005-276170 | A | 10/2005 |
| JP | 2009-037310 | A | 2/2009 |

OTHER PUBLICATIONS

Notice of the First Office Action dated Aug. 15, 2011, in Chinese Application No. 201010133519.9.

International Business Machine, Corporation "IBM WebSphere MQ Workflow, Concepts and Architecture, Version 3.6," pp. 1-66, Jun. 2005.

State Intellectual Property Office of the People's Republic of China, Office Action dated Sep. 4, 2012, in connection with Application No. 201010133519.9 (9 pages).

* cited by examiner

*Primary Examiner* — Kenneth Tang
(74) *Attorney, Agent, or Firm* — Fitzpatrick, Cella, Harper & Scinto

(57) ABSTRACT

There is disclosed an information processing apparatus and method for executing a workflow having a plurality of steps (and corresponding method). The information processing apparatus registers the workflow having a plurality of steps and manages a start parameter for indicating a condition for starting each step included in the workflow and an end parameter that is generated at an end of the each step. The apparatus determines a second step for following a first step based on the end parameter of the first step and the managed start parameters.

5 Claims, 17 Drawing Sheets

FIG. 12

| FLOW ID (1301) | FLOW TYPE (1302) | ORDER OF STEPS IN WHICH FLOW IS EXECUTED (1303) | NAME OF FUNCTION PROVIDED IN STEP (1304) |
|---|---|---|---|
| 1 | MAIN | 1 | INPUT |
| | | 2 | AUTHENTICATE |
| | | 3 | TRANSMIT |
| 2 | SUB | 1 | LOG IN |
| | | 2 | CONFIRM MY ADDRESS |
| | | 3 | SELECT ADDRESS BOOK |
| 3 | SUB | 1 | DESIGNATE "FROM" ADDRESS |
| | | 2 | DESIGNATE "TO" ADDRESS |
| | | 3 | DESIGNATE DOCUMENT NAME |
| 4 | SUB | 1 | LOG IN |
| | | 2 | SELECT CABINET |
| | | 3 | SELECT STORAGE-DESTINATION FOLDER |

F I G. 13A

| FLOW ID (1401) | ORDER OF STEPS IN WHICH FLOW IS EXECUTED (1402) | START PARAMETER (1403) | END PARAMETER (1404) |
|---|---|---|---|
| 1 | 1 | – | INFORMATION RELATED TO INPUT OPERATION |
| | 2 | – | INFORMATION RELATED TO INPUT OPERATION + INFORMATION RELATED TO AUTHENTICATION (LOG IN) |
| | 3 | – | INFORMATION RELATED TO INPUT OPERATION + INFORMATION RELATED TO AUTHENTICATION + INFORMATION RELATED TO OUTPUT OPERATION |
| 2 | 1 | INFORMATION RELATED TO INPUT OPERATION | INFORMATION RELATED TO INPUT OPERATION + INFORMATION RELATED TO AUTHENTICATION (LOG IN) |
| | 2 | – | INFORMATION RELATED TO INPUT OPERATION + INFORMATION RELATED TO AUTHENTICATION (LOG IN, MY ADDRESS) |
| | 3 | – | INFORMATION RELATED TO INPUT OPERATION + INFORMATION RELATED TO AUTHENTICATION (LOG IN, MY ADDRESS, ADDRESS BOOK) |

FIG. 13B

| | | | |
|---|---|---|---|
| 3 | 1 | INFORMATION RELATED TO INPUT OPERATION + INFORMATION RELATED TO AUTHENTICATION (LOG IN) | – |
| | 2 | INFORMATION RELATED TO INPUT OPERATION + INFORMATION RELATED TO AUTHENTICATION (LOG IN,MY ADDRESS) | – |
| | 3 | INFORMATION RELATED TO INPUT OPERATION + INFORMATION RELATED TO AUTHENTICATION (LOG IN,MY ADDRESS, ADDRESS BOOK) | – |
| 4 | 1 | INFORMATION RELATED TO INPUT OPERATION + INFORMATION RELATED TO AUTHENTICATION (LOG IN) | – |
| | 2 | INFORMATION RELATED TO INPUT OPERATION + INFORMATION RELATED TO AUTHENTICATION (LOG IN, SERVER) | – |
| | 3 | INFORMATION RELATED TO INPUT OPERATION + INFORMATION RELATED TO AUTHENTICATION (LOG IN, SERVER, CABINET ID) | – |

FIG. 14

| SUB-GROUP ID (1501) | SUB-GROUP NAME (1502) | START PARAMETER (1503) | FLOW ID (1504) |
|---|---|---|---|
| Sub-1 | SUB-GROUP 1 | INFORMATION RELATED TO INPUT OPERATION + INFORMATION RELATED TO AUTHENTICATION (LOG IN) | 3 |
| | | | 4 |

INFORMATION PROCESSING APPARATUS AND METHOD OF CONTROLLING SAME

BACKGROUND OF THE INVENTION

1. Field of the Invention

The present invention relates to an information processing apparatus and method of controlling the same to automatically create and modify a workflow that defines a plurality of cooperating operations or processes.

2. Description of the Related Art

Multifunction peripherals (MFPs) that combine the functions of a printer, copier and facsimile, etc., have come into widespread use in recent years. Such a multifunction peripheral has a function that enables a plurality of operations (i.e. processing steps) to be executed as a single job in order to simplify user tasks in an office or the like. Since various forms of user tasks are conceivable, it is necessary to be able to define any combination of operations (such a combination being referred to as a "workflow" below). Since the creation of such a workflow is a complex process, the general practice is for an administrator to create the workflow using an editing tool of a client computer (referred to as a "personal computer" below) and to distribute the workflow to the multifunction peripheral. Since the user can thus execute the respective task by utilizing the distributed workflow, the efficiency of the operation is enhanced.

A process comprising the operations "read document→authenticate→transmit" is a specific example of a workflow that may be distributed to a multifunction peripheral. When a workflow is executed by a multifunction peripheral, first a utilization environment is provided in which log-in is performed by a user on a per-user basis. The multifunction peripheral is at this time in a state in which initial values of settings that can be configured in advance have been configured. Then, when the user is supplied with the workflow, the user sets the initial values of each operation that corresponds to a function of the MFP. An example of the setting of initial values is as follows: in the case of a "read document" function, the user designates the scanner reading conditions. In the case of an "authenticate" function, the user designates the user information to be logged into the server that is accessed. In the case of a "transmit" function, the user designates the destination of the transmission.

The specification of Japanese Patent Application Laid-Open No. 2003-203148 describes a system in which an administrator creates workflows made up of a series of related processes (each including at least one operation) using a tool on a personal computer and supplies the workflows as workflows containing a plurality of patterns; i.e. alternative processes containing permutations of available operations. A user selects and utilizes a desired workflow from the plurality of workflows supplied. As a result, it is possible for the user to utilize a workflow with a particular set of operations. As a result, it is no longer necessary to re-enter setting values (as they are already set) in a workflow having a high frequency of use, and the efficiency of the operation is improved while user convenience is enhanced.

With the prior art described above, however, a plurality of workflow patterns including several related processes have to be created and provided beforehand by the administrator even where ordinary operation is assumed. Accordingly, the administrator who creates, updates and manages workflows (or even the creator who creates the workflows) must create and manage a potentially large number of workflows. This imposes a heavy burden upon the administrator.

FIG. 6 describes a specific example for explaining the problem dealt with by the present invention.

A workflow (flow ID=1) 7001 is a workflow that has been created by an administrator and is capable of being executed by a multifunction peripheral. The workflow is divided into a plurality of operations in a regular order and the workflow defines the sequence of the operations and the processing content of each operation. Management of the workflow is such that when the processing of each operation ends and an end state (defined by an "end parameter") is attained, the processing of the next operation begins. This is defined by a "start parameter". This workflow 7001 forms the source of a call and is referred to as a "main flow" below. The main flow 7001, which is composed of a plurality of steps representing operations that will be carried out by the MFP, includes the steps of reading a document (step 1), authenticating (step 2) and transmitting (step 3). The main flow 7001 is capable of calling corresponding workflows. Each workflow called is referred to as a "subflow". A subflow defines the units of a segmented operation, in which the processing of a prescribed operation has been segmented, and the subflow also defines the connection of the units to the main flow at the beginning and end of the segmented operation.

The "read document" operation (step 1) of the main flow 7001 represents a function of reading a document in the multifunction peripheral and the function generally comprises utilizing a scanner. A subflow 7002 indicates a subflow (flow ID=2) that is called by the authenticating step (step 2). This subflow 7002 includes a log-in step (step 1), a my address confirmation step (step 2) and an address book selection step (step 3). Subflow 7002 indicates the required processing for providing a function whereby a server, which supplies an e-mail function, acquires information managed on a per-user basis and executes user authentication. A subflow 7003 (flow ID=3) is called by the transmitting operation (step 3) of the main flow 7001. The subflow 7003 includes a "FROM" address designating step (step 1), a "TO" address designating step (step 2) and a document-name designating step (step 3). The subflow 7003 indicates the processing steps for setting information necessary in order to transmit an e-mail with an attached file to a server that provides an e-mail function. Thus, an administrator or creator creates the main flow 7001, which includes these subflows 7002, 7003, and then supplies the main flow 7001 to the multifunction peripheral that will execute the full workflow.

As a result, the user is capable of executing a workflow through a processing sequence that is in accordance with the main flow 7001, subflow 7002 and subflow 7003.

Next, an example in which the structure of such a workflow is modified will be described.

FIG. 7 is a diagram illustrating an example of modification of the workflow shown in FIG. 6. FIG. 7 differs from FIG. 6 in that in a subflow 8002 (ID=2-1) of FIG. 7, the address book selecting step (step 3) of the subflow 7002 in FIG. 6 has been omitted, and in that in a subflow 8003 (ID=3-1) in FIG. 7, the FROM address designating step (step 1) of the subflow 7003 in FIG. 6 has been omitted. When such a modification is made, the workflow administrator or creator creates the workflow comprising main flow 8001, subflow 8002 and subflow 8003 of the kind shown in FIG. 7 and then supplies this workflow to the multifunction peripheral. Thus, when the workflow administrator or creator modifies the workflow, many workflows must be created, edited and managed and this greatly increases the burden of the operation.

SUMMARY OF THE INVENTION

It is desirable to solve the above-mentioned problem with conventional technology.

It is further desirable to facilitate the creation of workflows.

The present invention in its first aspect provides an information processing apparatus for executing a workflow having a plurality of steps, comprising: a flow registration unit that registers the workflow having a plurality of steps; a flow management unit that manages a start parameter for indicating a condition for starting each step included in the workflow and an end parameter that is generated at an end of the each step; and a determination unit that determines a second step for following a first step based on the end parameter of the first step and start parameters managed by the flow management unit.

The present invention in its second aspect provides a method of controlling an information processing apparatus for executing a workflow having a plurality of steps, the method comprising: defining a start parameter and an end parameter for each of a plurality of steps that may be performed by the information processing apparatus; comparing the end parameter of a current step with the start parameters of a plurality of other steps; and allocating, as the subsequent step in the workflow to be created, a step that has a start parameter that matches the end parameter of the current step.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 is a diagram illustrating an example of a flow information management table managed by a flow management section;

FIGS. 13A and 13B are diagrams illustrating examples of a parameter management table managed by the flow management section;

FIG. 14 is a diagram illustrating an example of a sub-group parameter management table managed by the flow management section;

DESCRIPTION OF THE EMBODIMENTS

Embodiments of the present invention will now be described in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
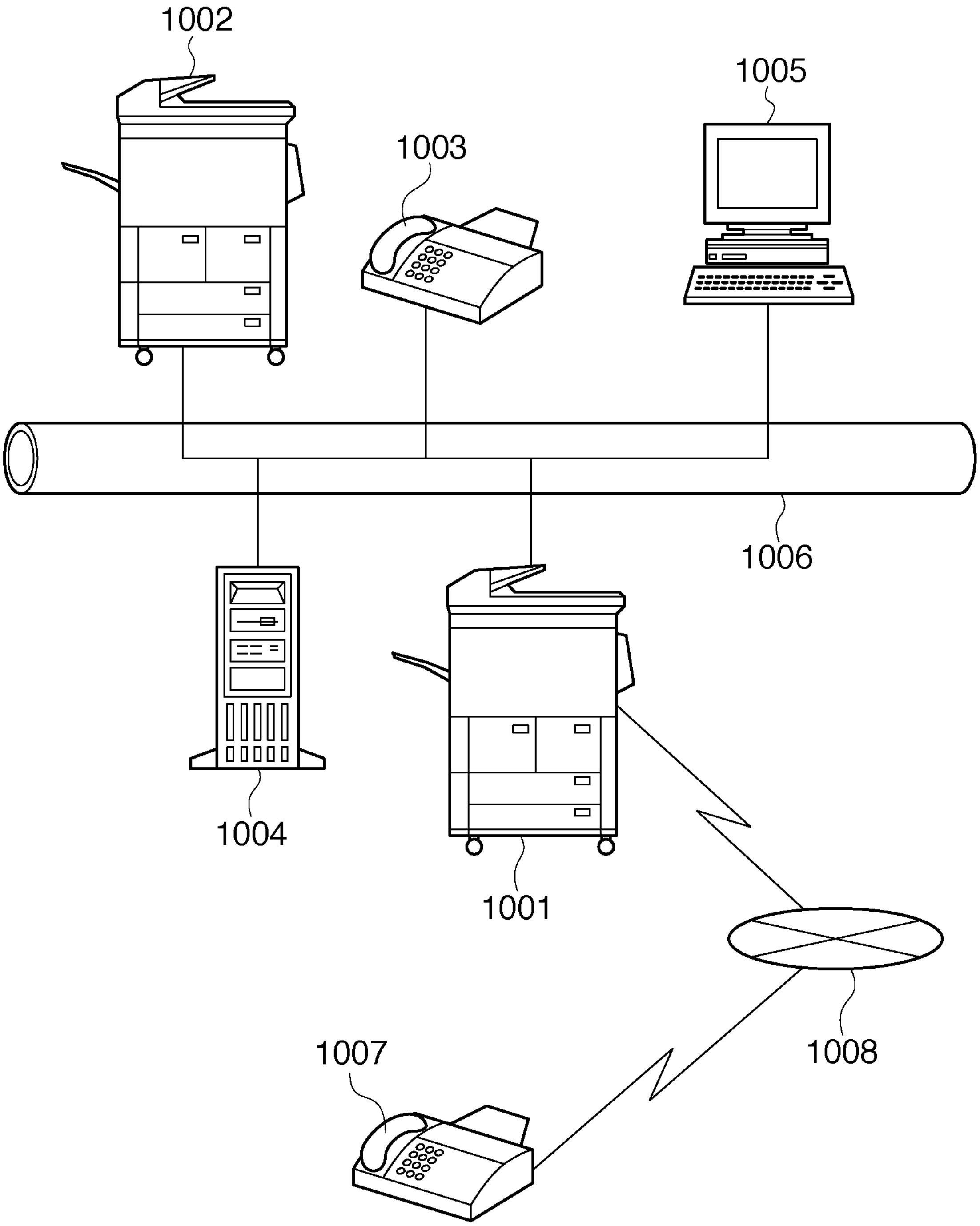
FIG. 1 is a diagram illustrating the configuration of an information processing apparatus according to an embodiment of the present invention.

FIG. 1 is a diagram illustrating the configuration of an information processing system that includes a multifunction peripheral and client computer according to an embodiment of the present invention. It should be noted that the multifunction peripheral according to this embodiment will be described with regard to a case where a copier has a data transmitting and receiving (also known as transceiving) function.

A copier 1001 is connected to a Local Area Network (LAN) 1006 together with a copier 1002, a facsimile machine 1003, a database/mail server (referred to simply as a "server" below) 1004 and a client computer (referred to as a "personal computer" below) 1005. The copier 1002 has functions identical with those of the other copier 1001. The LAN 1006 is a network such as Ethernet™. Further, the copier 1001 is connected to a facsimile machine 1007 via a public line 1008. The copier 1001 has a copy function and a facsimile function, as well as a data transmit function for reading a document and transmitting image data, which has been obtained by reading the document, to each device on the LAN 1006. The copier 1001 further has a PDL (Page Description Language) function, is capable of receiving PDL data from the personal computer 1005 connected to the LAN 1006 and is capable of printing the PDL data. Further, the copier 1001 is capable of storing image data read by the copier 1001, or PDL data specified from the personal computer 1005 connected to the LAN 1006, in a designated box area of a hard-disk drive 2004 (shown in FIG. 2) of the copier 1001. The copier 1001 can also read out and print image data that has been stored in the box area. Further, the copier 1001 can receive image data, which has been read by the other copier 1002, via the LAN 1006, and can store the image data on the hard-disk drive 2004 of the copier 1001 or it can print the image data. Further, image data can be received from the server 1004 via the personal computer 1005 and LAN 1006 and saved in the copier 1001 or it can be printed. Further, the facsimile machine 1003 is capable of receiving data, which has been read by the copier 1001, via the LAN 1006 and can transmit the received data by facsimile.

The server 1004 is an apparatus having a function for receiving data, which has been read by the copier 1001, via the LAN 1006, storing the received data as a database and transmitting the data as e-mail.

By being connected to the server 1004, the personal computer 1005 can acquire and display desired data from the server 1004. Further, the personal computer 1005 can receive data, which has been read by the copier 1001, via the LAN 1006 and can manipulate and edit the received data.

The facsimile machine 1007 is capable of receiving data, which has been read by the copier 1001, via the public line 1008 and of printing the received data.

Figure 2:
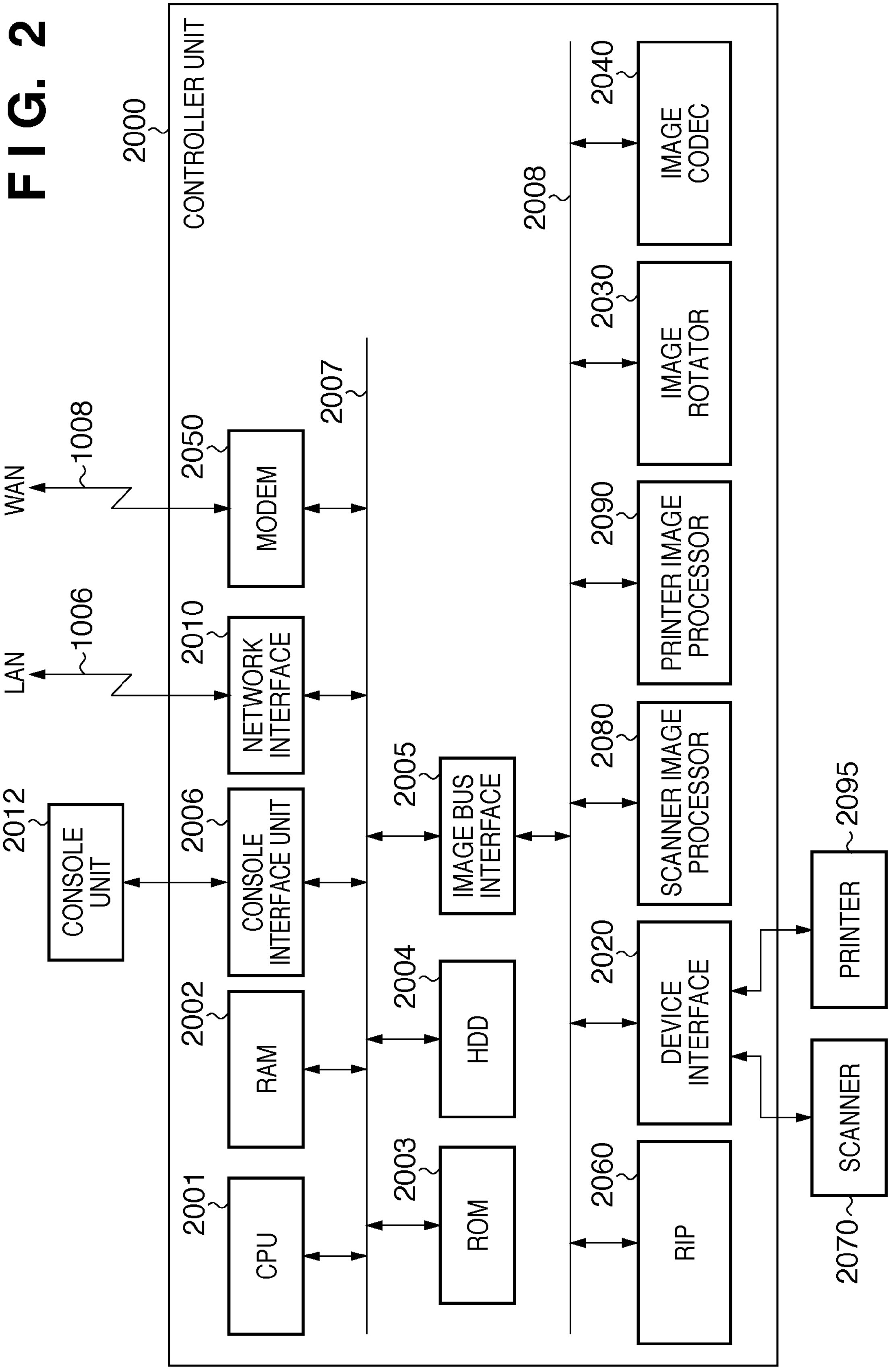
FIG. 2 is a block diagram illustrating the configuration of a main portion of the copier according to an embodiment.

FIG. 2 is a block diagram illustrating the main portion of the copier 1001 according to this embodiment.

The copier 1001 includes a controller unit 2000, to which are connected a scanner 2070 serving as an image input device, a printer unit 2095 serving as an image output device and a console unit 2012. The controller unit 2000 exercises control for implementing a copy function whereby image data read by the scanner 2070 is printed by the printer unit 2095. By being connected to the LAN 1006 or public line (WAN or Wide Area Network) 1008, the controller unit 2000 is capable of inputting and outputting image information and device information via the network and the public line.

The structure of the controller unit 2000 and the flow of processing executed thereby will now be described.

The controller unit 2000 has a CPU 2001. The CPU 2001 launches an operating system by a boot program that has been stored in a ROM 2003. An application program that has been (installed and) stored on the hard-disk drive 2004 is loaded in a RAM 2002 and run by the operating system, whereby various processing is executed. The RAM 2002 is used as the work area of the CPU 2001. The RAM 2002 further provides a memory area for storing programs and image data temporarily. The hard-disk drive 2004 is also used to store image data.

In addition to the ROM 2003 and RAM 2002, a console interface unit 2006, a network interface 2010, a modem 2050 and an image bus interface 2005 are connected to the CPU 2001 via a system bus 2007. The console interface unit 2006 controls interfacing with the console unit 2012, which has a touch-sensitive panel, outputs image data (which is to be displayed on the console unit 2012) to the console unit 2012, and sends the CPU 2001 information that the user has input using the console unit 2012.

The network interface 2010 is connected to the LAN 1006 and inputs/outputs information from and to each device on the LAN 1006 via the LAN 1006. The modem 2050 is connected to the public line 1008 and inputs/outputs information via the public line 1008.

The image bus interface 2005 is a bus bridge for connecting the system bus 2007 to an image bus 2008, which transfers image data at high speed. The image bus interface 2005 is further used for converting the data format between buses. The image bus 2008 is constituted by a PCI (Peripheral Component Interconnection) bus or an IEEE 1394 bus (Institute of Electrical and Electronics Engineers high-speed serial bus standard). Connected to the image bus 2008 are a raster image processor (RIP) 2060, a device interface 2020, a scanner image processor 2080, a printer image processor 2090, an image rotator 2030 and an image codec 2040.

The RIP 2060 expands PDL data into a bitmap image. The device interface 2020, to which are connected the scanner 2070 and printer unit 2095, subjects the image data to a synchronous/asynchronous conversion. The scanner image processor 2080 subjects input image data, which has been input from the scanner 2070, to correction, manipulation and editing. The printer image processor 2090 subjects image data, which is output to the printer unit 2095, to correction and resolution conversion, etc. The image rotator 2030 rotates image data. The codec 2040 compresses multilevel image data to JPEG (Joint Photographic Electronic (or Experts) Group) data and compresses bi-level image data to data such as JBIG (Joint Bi-level Image Experts Group), MMR (Modified Modified Read) or MH (Modified Huffman) data, and decompresses the compressed data.

Figure 3:
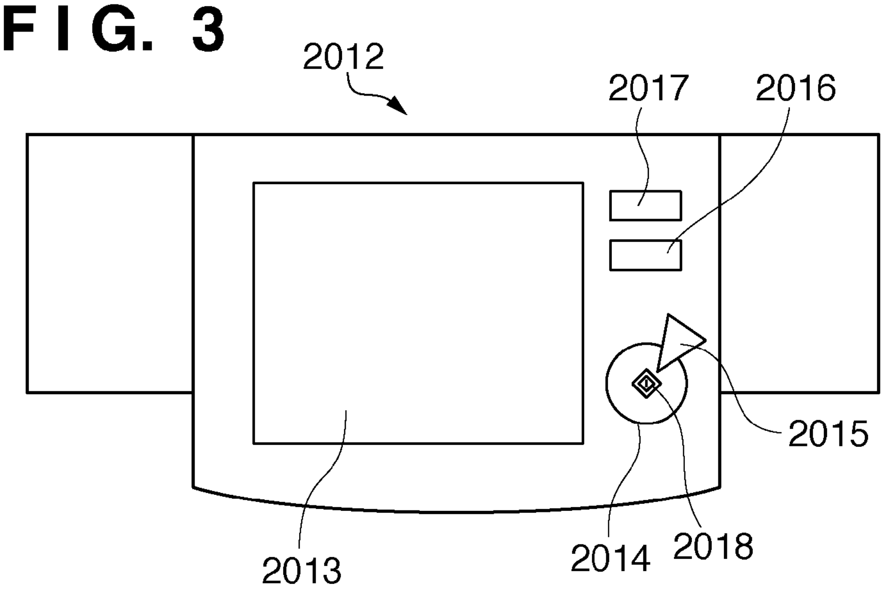
FIG. 3 depicts a plan view illustrating the configuration of a console unit of the copier according to an embodiment.

FIG. 3 depicts a plan view illustrating the configuration of the console unit 2012 of the copier 1001 according to this embodiment of the present invention.

A display unit 2013 includes a touch-sensitive panel affixed to a display screen and displays a screen for operating the copier 1001. If a key displayed on the screen is pressed, the corresponding position information is sent to the CPU 2001 of the controller unit 2000. A start key 2014 is used to start the reading of a document image. Provided at the centre of the start key 2014 is a two-colour (green and red) LED 2018 the colour of which indicates whether the start key 2014 is operable. A stop key 2015 is for halting an operation that is currently in progress. An ID key 2016 is used when the user inputs a user ID. A reset key 2017 is used to initialize settings from the control panel.

Figure 4:
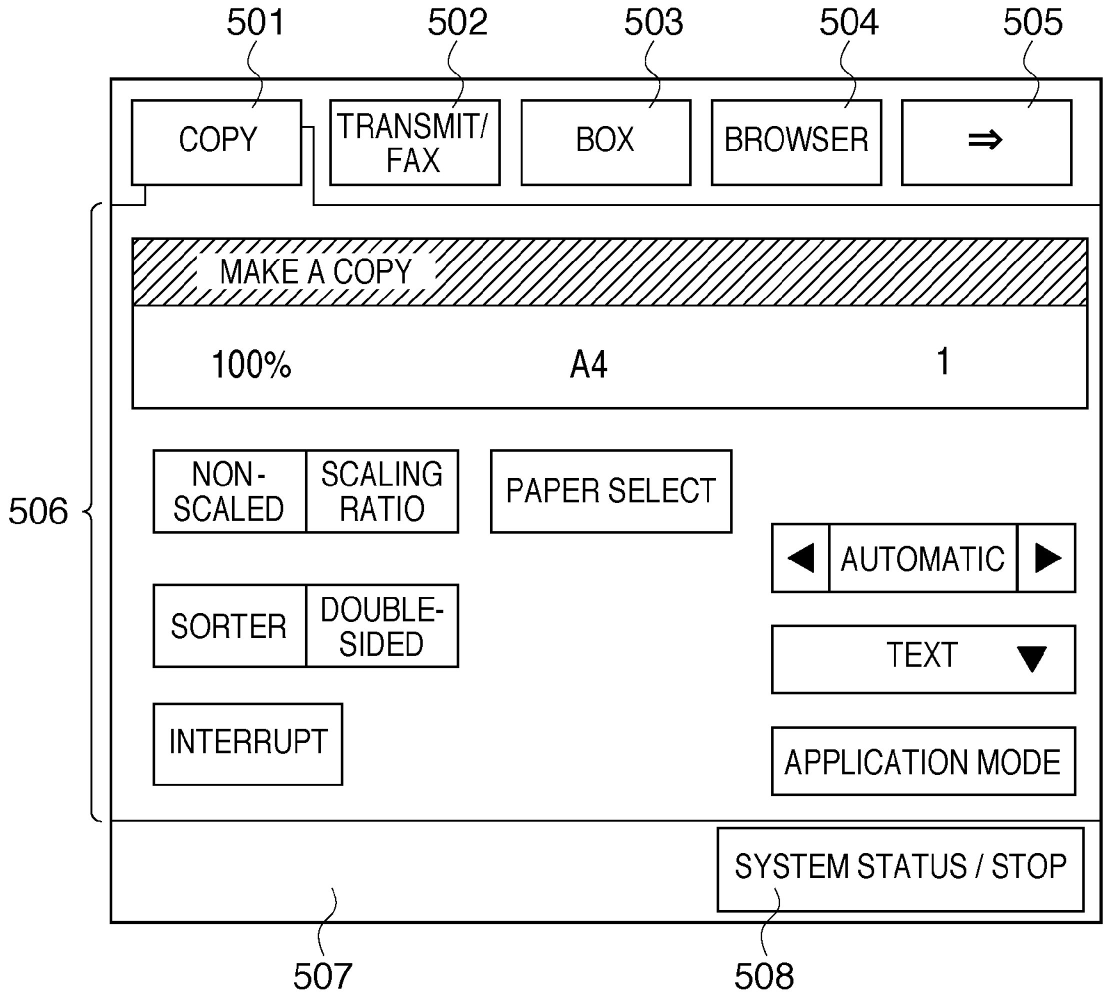
FIG. 4 is a diagram illustrating an example of an operating screen displayed on the console unit of the copier.

FIG. 4 is a diagram illustrating an example of an operating screen displayed on the console unit 2012 of the copier 1001 according to this embodiment.

Touch-sensitive keys, namely a copy tab 501 for selecting various functions, a transmit/fax tab 502, a box tab 503, a browser tab 504 and right-arrow key 505, are displayed at the top of the operating screen of console unit 2012.

FIG. 4 illustrates an initial screen of the copy function when the touch-sensitive copy tab 501 is pressed. A display relating to various settings for the copy function is presented in an area 506. Status to be displayed by the copy function is displayed in an area in which the message "MAKE A COPY" of area 506 is being displayed. Here "100%" indicates a non-scaled copy, "A4" indicates the paper size, and "1" indicates the number of copies to be made. Displayed below this area as touch-sensitive keys for setting the operating mode of the copy function are "NON-SCALED", "SCALING RATIO", "PAPER SELECT", "SORTER", "DOUBLE-SIDED", "INTERRUPT", "TEXT" and density adjustment keys. A left-arrow key is a key for reducing density, a right-arrow key is key for raising density, and an "AUTOMATIC" key is a key that specifies automatic adjustment of density. Further, an operating-mode designation screen whose display cannot fit on this initial screen will be displayed within the area 506 in hierarchical fashion by pressing an "APPLICATION MODE" key.

Further, a display area 507 is an area for displaying the status of the copier 1001. Examples of messages displayed here are an alarm message indicating paper jam or the like, and a status message indicating that PDL printing is in progress when PDL printing is being carried out. A "SYSTEM STATUS/STOP" key 508 is displayed in the display area 507. If the "SYSTEM STATUS/STOP" key 508 is pressed, a screen for displaying device information concerning the copier 1001 or a screen (not shown) for displaying the status of a print job is displayed. It is possible to specify the stopping of a print job using this screen.

If the transmit/FAX tab 502 is pressed, a setting screen (FIG. 4) for transmitting an image read by the copier 1001 to a device on the LAN 1006 by e-mail or FTP (File Transfer Protocol) or for transmitting the image by facsimile using the public line 1008 is displayed.

If the box tab 503 is pressed, a setting screen (not shown) is displayed for saving image data read by the copier 1001 in a box area of the hard-disk drive 2004 or, alternatively, for designating and printing image data that has been saved in a box area or for transmitting the image to a device on the LAN 1006.

Further, in a case where the controller unit 2000 has been equipped with five or more functions, a screen is displayed as follows: the right-arrow key 505 is displayed to the right of the four function tabs 501 to 504 for "COPY", "TRANSMIT/FAX", "BOX" and "BROWSER". If the right-arrow key 505 is pressed, a screen for other functions is displayed.

Figure 5:
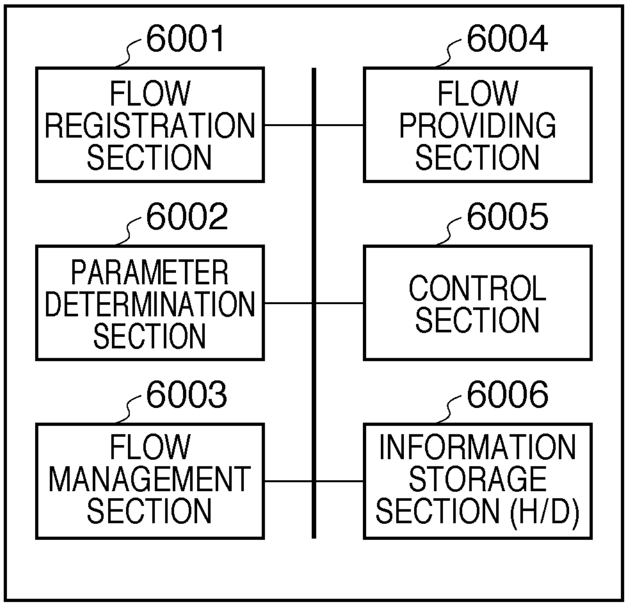
FIG. 5 is a block diagram useful in describing the functional configuration of a flow modification program according to an embodiment.

FIG. 5 is a block diagram useful in describing the functional configuration of a flow modification program according to an embodiment of the present invention.

This flow modification program is stored on the hard-disk drive 2004 of copier 1001 and is supplied to the user as an application program, by way of example. Further, the flow modification program may be stored in an information storage unit (hard-disk drive) possessed by the personal computer 1005 and then supplied to the user as an application program. It should be noted that a workflow defines a plurality of operations (steps) that cooperate through the medium of information. Here a workflow will be described through an example in which the workflow includes a main flow and subflows belonging to the main flow.

A flow registration section 6001 analyses workflow information composed of a plurality of steps supplied from a flow providing section 6004 and acquires workflow-related parameter information necessary in order to register the workflow. The parameter information acquired includes workflow type, information (type of process or operation and the order of the operations within the process) regarding each step of the workflow, a workflow-start parameter and a workflow-end parameter. The flow registration section 6001 registers the workflow thus analysed and delivers information indicating the result of analysis to a flow management section 6003. The start parameter provides a function for registering subflow information as sub-group information in a case where management of main flows and subflows within workflows is carried out. The information registered is delivered to the flow management section 6003.

A parameter determination section 6002 provides a function for specifying information regarding a start parameter, which is being managed by the flow management section 6003, and a function for determining the corresponding workflow in response to designation of the parameter information. By selecting one item of parameter information, candidates for parameter information to be used in succeeding steps in the workflow are determined.

In order to manage information delivered from the flow registration section 6001, the flow management section 6003 stores the flow type (described later), the sequence of the steps in the workflow and the parameters, all in a plurality of tables. The flow providing section 6004 provides a workflow in response to a request for acquisition of workflow information and a request for acquisition of parameter information relating to the workflow. Further, the flow providing section 6004 provides a subflow or other function in response to a request for acquisition of information relating to sub-group information. The flow providing section 6004 further provides a function for acquiring table information managed by the flow management section 6003. A control section 6005 is an application program that has been stored on the hard-disk drive 2004. The control section 6005 controls management (such as calling) of various functions and the processing of each function. A data storage section (memory/hard disk) 6006, which is constructed in a manner similar to that of the hard-disk drive 2004, is a database for holding necessary information. The flow registration section 6001 is capable of registering a plurality of workflows in response to a designation of workflow information that is to be registered.

Figure 8:
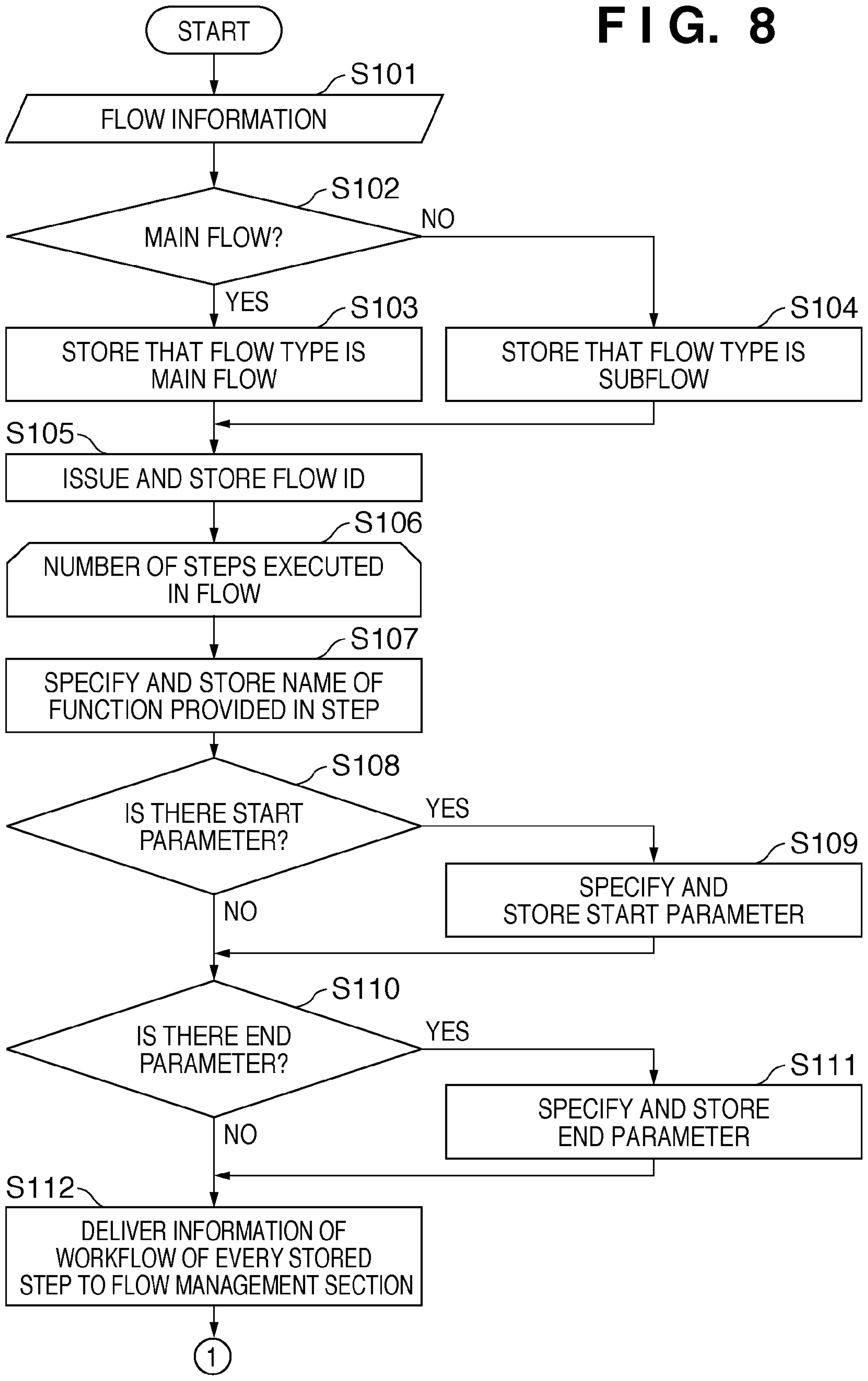
FIGS. 8 and 9 are flowcharts describing a flow modification program according to an embodiment.
Figure 9:
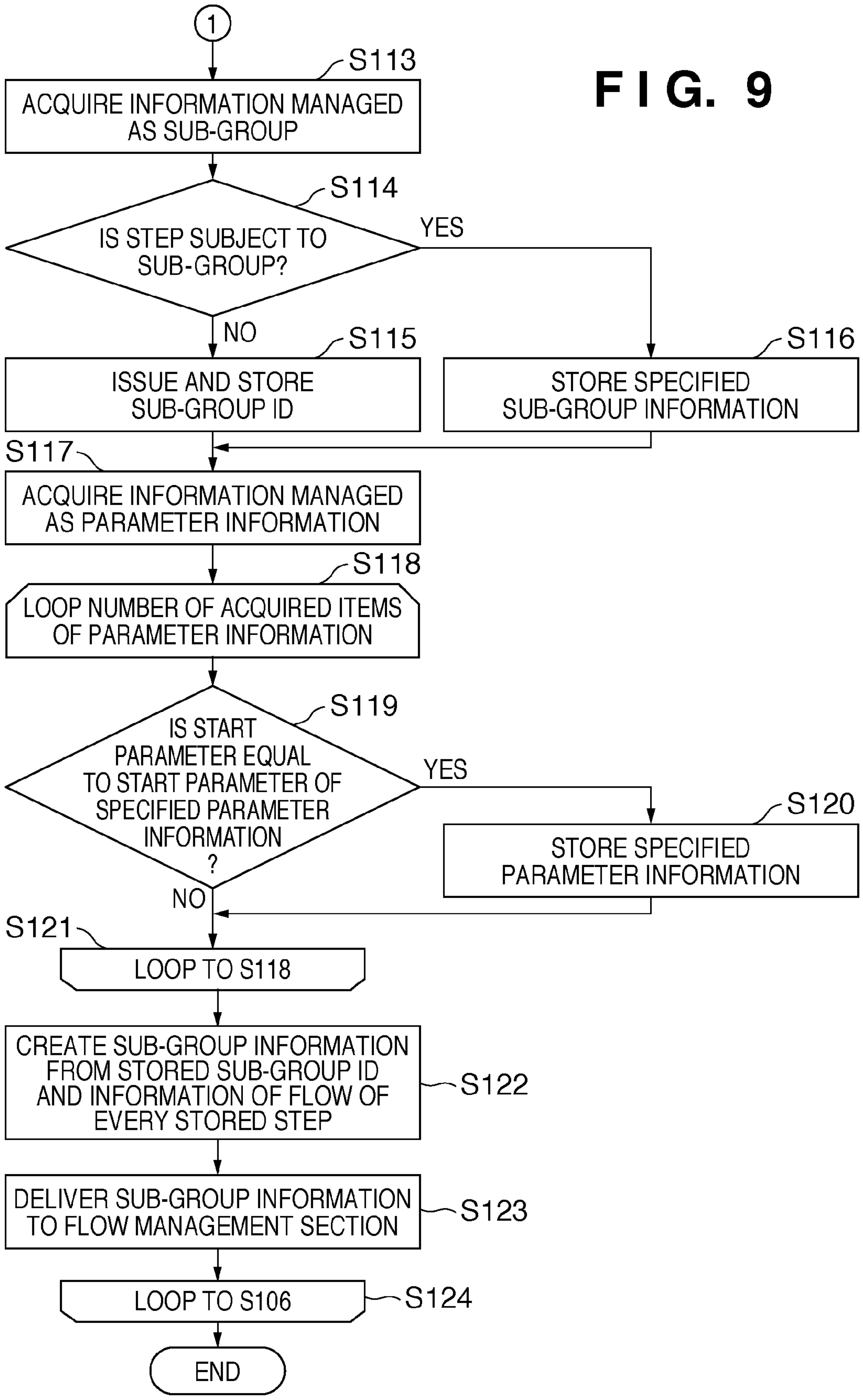

FIGS. 8 and 9 are flowcharts describing processing by the control section (FIG. 5) for controlling a flow modification program according to this embodiment. This processing indicates processing executed by the control section 6005 from delivery of information regarding a workflow (which is to be registered), the delivery being from the flow providing section 6004, to registration of the flow.

Figure 10:
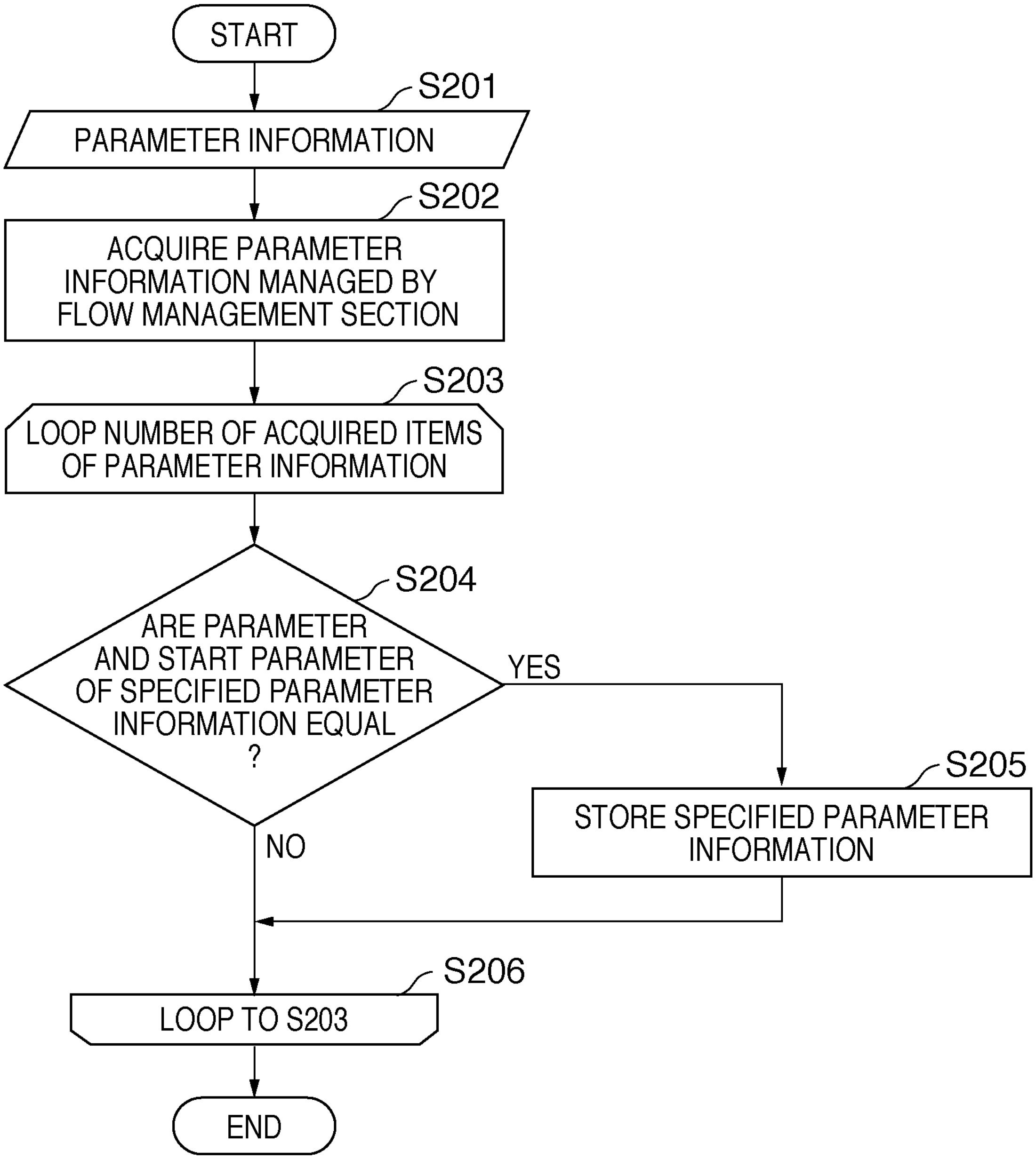
FIGS. 10 and 11 are flowcharts describing processing executed by a control section of a flow modification program according to an embodiment.
Figure 11:
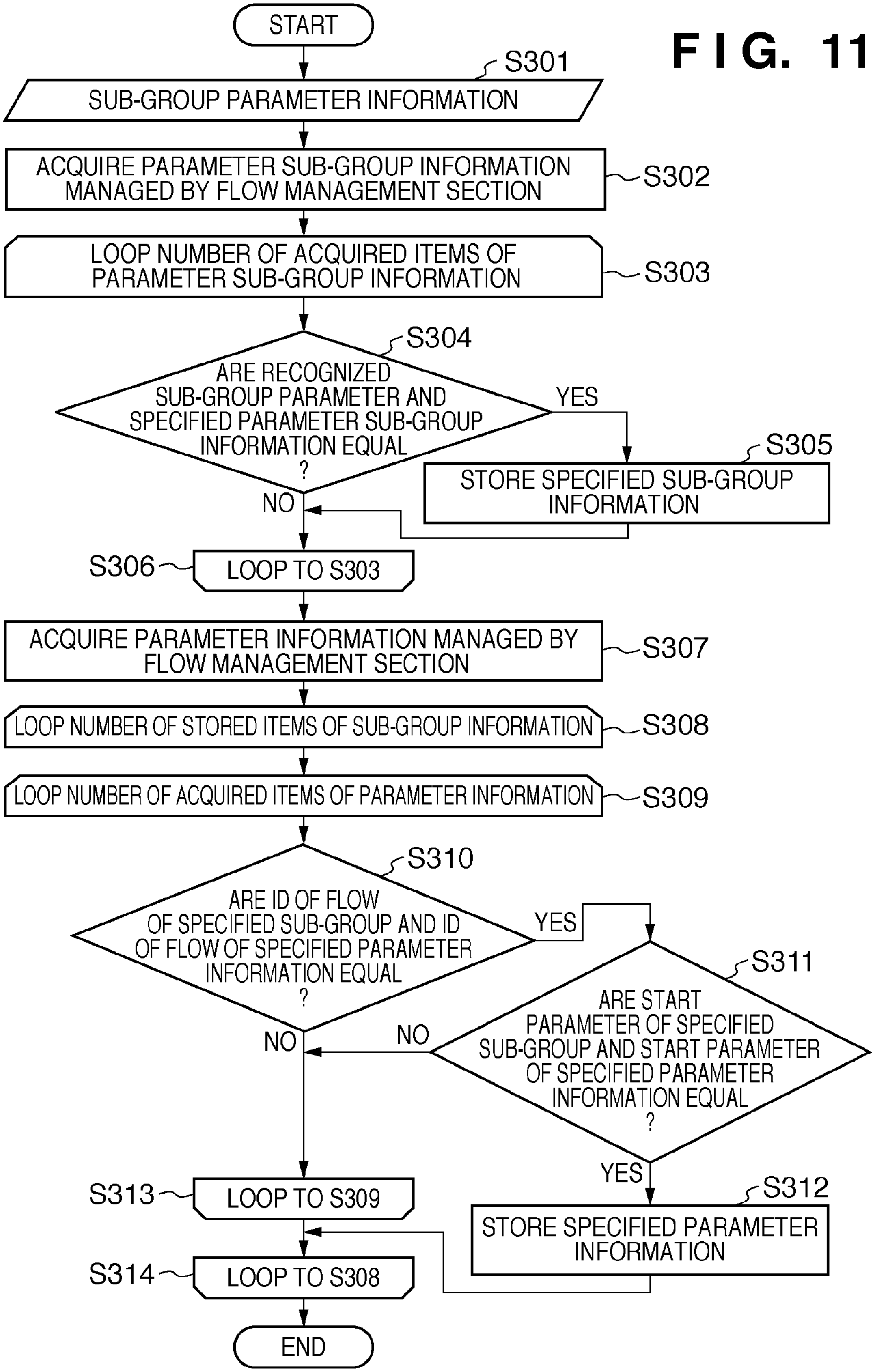

FIGS. 10 and 11 are flowcharts describing processing, which is executed by the control section of the flow modification program according to this embodiment, for specifying and determining the workflow based upon parameter information or sub-group parameter information.

Reference will be made to the flowcharts of FIGS. 8 and 9 for describing the flow of processing for creating and registering a workflow in accordance with main flow information that has been provided.

First, in step S101, the control section 6005 calls the flow registration section 6001 and starts processing. Here the control section 6005 delivers flow information, which has been supplied from the flow providing section 6004, to the flow registration section 6001. The flow registration section 6001 sends back to the control section 6005 an indication that this flow information has been recognized. The control section 6005 requests the flow registration section 6001 to determine the type of workflow. Next, in step S102, the flow registration section 6001 determines whether the flow information is information concerning a main flow or a subflow and sends the result of the determination back to the control section 6005. Control proceeds to step S103 if it is determined that the flow is a main flow or to step S104 if it is determined that the flow is a subflow. In step S103, the control section 6005 stores the fact that the type of workflow is the main flow in a temporary storage area (assumed, by way of example, to be the hard-disk drive 2004, and the same will hold true below). Control then proceeds to step S105. In step S104, on the other hand, the control section 6005 stores the fact that the type of workflow is a subflow in a temporary storage area. This also is followed by step S105, at which the control section 6005 requests the flow registration section 6001 to issue the workflow ID (identification number) and then acquires the unique workflow ID. At this time the flow registration section 6001 issues a sequential unique ID and sends the ID back to the control section 6005. The control section 6005 stores the acquired unique workflow ID in the temporary storage area. It should be noted that the ID is not limited to a numeral and may be any form of identifier.

Next, control proceeds to step S106. This step is a step of recognising the number of steps that are to be executed in the workflow, the information of which was registered by the flow registration section 6001 in step S101. Here the control section 6005 causes the flow registration section 6001 to execute loop processing from this step S106 through all of the steps to step S124 and back to step S106 (see FIG. 9) for each of a plurality of steps (processes) that have been designated by the flow information recognized.

Figure 6:
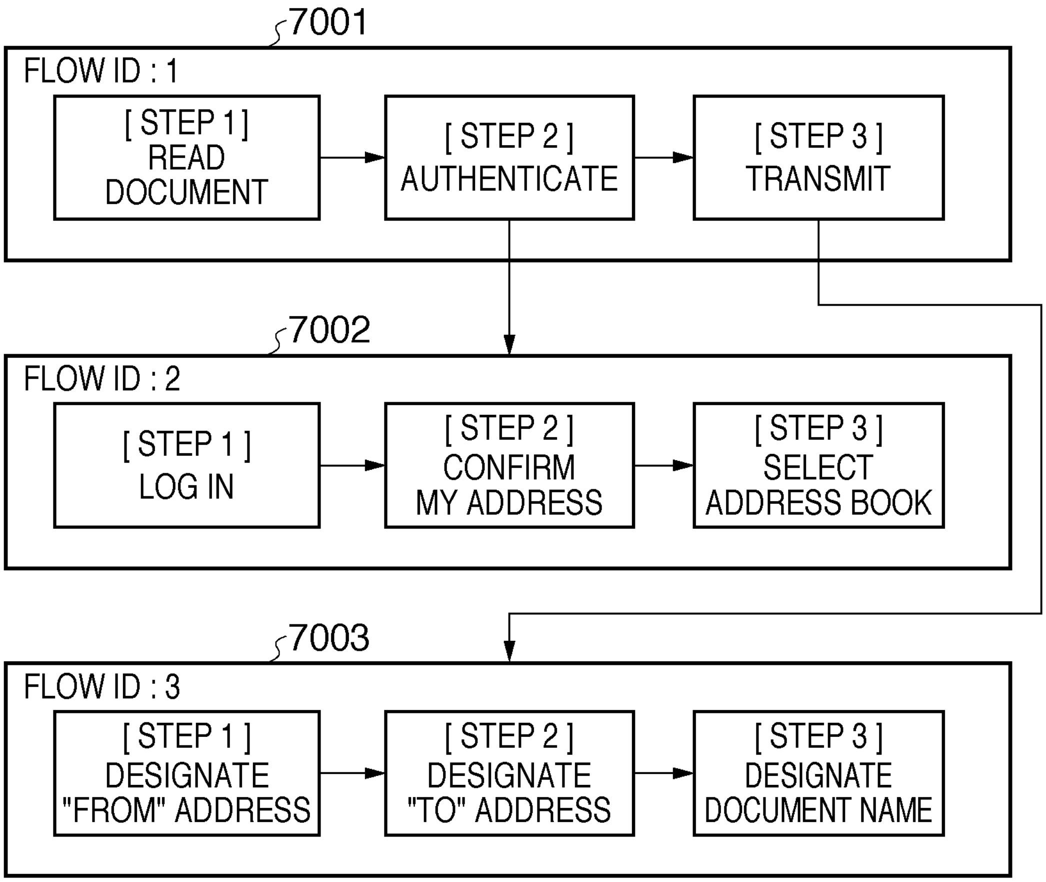
FIG. 6 is a diagram for describing a specific example for explaining the problem dealt with in the present invention.
Figure 7:
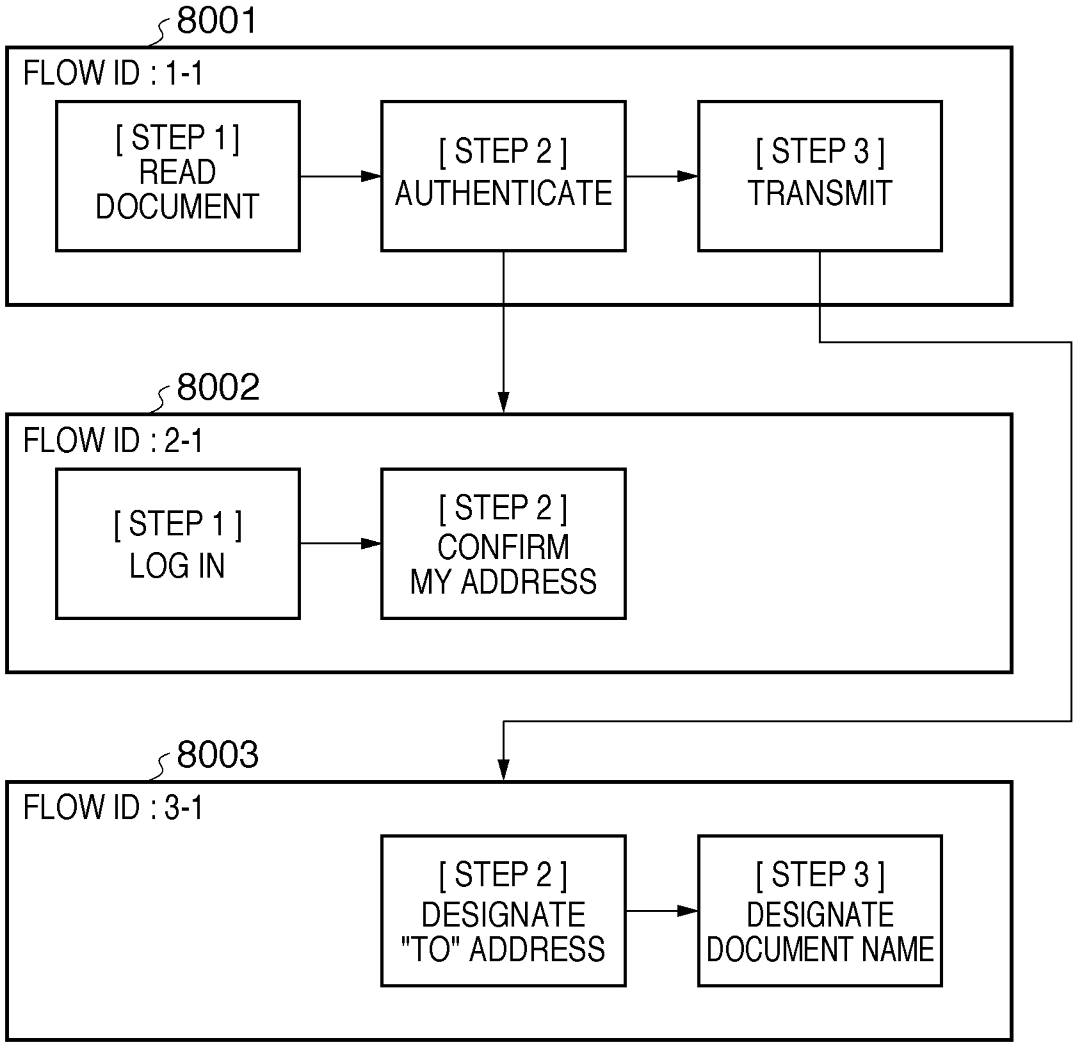
FIG. 7 is a diagram illustrating an example of modification of the workflow shown in FIG. 6.

Next, in step S107, the control section 6005 requests, from the flow registration section 6001, information concerning the name designated for each step that has been specified (e.g., the name of each of the steps of FIG. 6). The flow registration section 6001 specifies the information regarding the name specified for the step of the workflow and sends the name back to the control section 6005. The control section 6005 stores the information of the acquired name in the temporary storage area. Next, control proceeds to step S108, at which the control section 6005 requests the flow registration section 6001 to determine whether or not the step that has been specified has a start parameter. If it is determined here that the step has a start parameter, control proceeds to step S109. Here the control section 6005 acquires the start parameter specified by the flow registration section 6001 and stores the information regarding the acquired start parameter in the temporary storage area. Control then proceeds to step S110. If it is determined that the step does not have a start parameter, on the other hand, then control proceeds to step S110 directly. Here the control section 6005 requests the flow registration section 6001 to determine whether or not the step that has been specified has an end parameter. If it is determined here that the step has an end parameter, control proceeds to step S111. Here the control section 6005 acquires the end parameter specified by the flow registration section 6001 and stores the information of the acquired end parameter in the temporary storage area. Control then proceeds to step S112. If it is determined that the step does not have an end parameter (or the end parameter has no value), on the other hand, then control proceeds to step S112 directly. Here the control section 6005 delivers, to the flow management section 6003, the information regarding the workflow of every step stored in the temporary storage area. The flow management section 6003 stores the delivered workflow information in a table for containing parameter information (described later) managed by the flow management section 6003. Control then proceeds to step S113 in FIG. 9.

Figure 17:
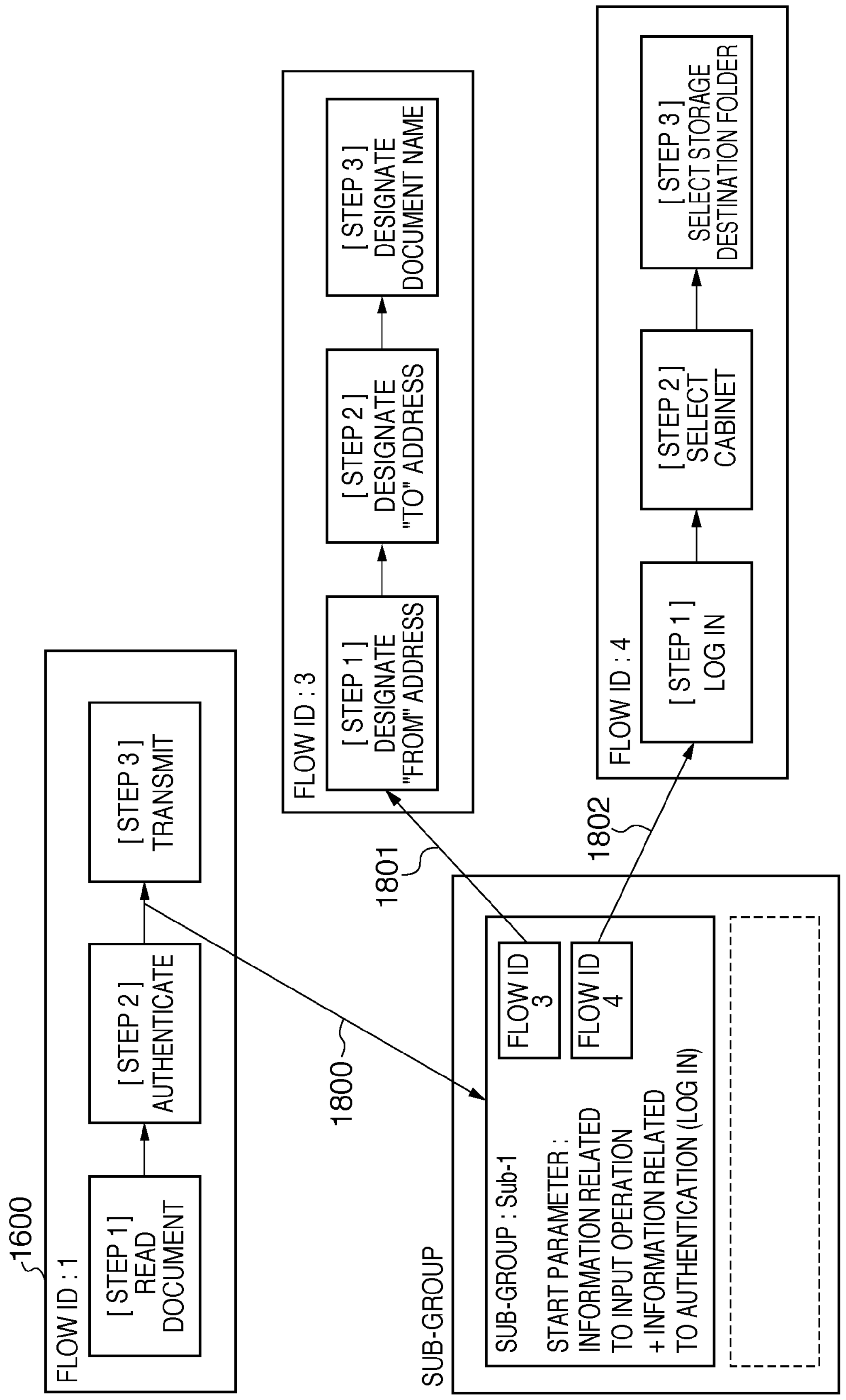
FIG. 17 depicts a conceptual view in which workflows are grouped and supplied from a parameter determination section of a flow modification program.

In step S113, the control section 6005 requests, from the flow providing section 6004, information representing one or more parameters of steps in the workflow. For example, a sub-group may contain only one start parameter that applies to two different subflows, as shown in FIG. 17. This parameter information is managed as a sub-group of the total information about the whole workflow. In alternative embodiments, the sub-group of information could contain all of the parameters associated with one subflow, one operation or one step within a workflow, or the sub-group could contain all of the parameters of a specific number of steps. Yet alternatively, the sub-group may contain the parameter that is the same over several steps (such as all of the start parameters of a workflow), or it could even contain an arbitrary number of parameters. In response, the flow providing section 6004 acquires all items of information being managed by a parameter sub-group information management table (FIG. 14) (to be described later), and the control section 6005 recognizes the acquired parameter sub-group information being managed. Next, control proceeds to step S114, in which the control section 6005 checks to see whether or not the acquired parameter sub-group information contains a start parameter of a specified step. That is, the control section 6005 determines whether or not the specified step can be a sub-group. What is meant by this is that if the sub-group that has been acquired contains the start parameter of an appropriate step (e.g. a step that is suitable to be carried out), the sub-group can be identified by that step and so the sub-group can be identified using an identifier that is related to the step in question. On the other hand, if the acquired sub-group does not contain the start parameter of a specified step, the sub-group is not relevant to that step and a separate identifier will have to be created for the sub-group until it is identified (or until it is to be used; i.e. until it contains a parameter regarding the target step). If it is determined here that the specified step can be the sub-group, control proceeds to step S116 and the control section 6005 stores the sub-group ID of the specified sub-group information in the temporary storage area. Control then proceeds to step S117. On the other hand, if it is determined here that the step is not a subject of the sub-group, then control proceeds to step S115. Here the control section 6005 requests that the flow registration section 6001 issues a sub-group ID, acquires this ID and advances control to step S117. At this time the flow registration section 6001 issues a sequential unique ID and sends this ID back to the control section 6005. The control section 6005 stores the acquired unique ID in the temporary storage area.

In step S117, the control section 6005 acquires all items of parameter information managed by the flow management section 6003 and recognizes the acquired parameter information. Control proceeds to step S118, at which the control section 6005 requests the flow registration section 6001 to execute loop processing from this step S118 through all steps to step S121 and back to step S118 with regard to all items of parameter information acquired in step S117. Next, in step S119, the control section 6005 requests the flow registration section 6001 to determine whether or not the recognized information regarding the start parameter is equal to the start parameter of specified parameter information, which is parameter information associated with a specified step mentioned above. By "specified" step, what is meant is the step that is presently being carried out, for example, in the present loop between steps S106 and S124 shown in FIGS. 8 and 9. If the flow registration section 6001 determines that these items are equal, control proceeds to step S120. Otherwise, the loop continues. In step S120, the control section 6005 stores the specified parameter information in the temporary storage area and continues the loop. When processing with regard to all acquired parameters thus ends in step S121, control proceeds to step S122. In step S122, the control section 6005 creates sub-group information from the sub-group information that was stored in step S120 because its start parameter was equal to the start parameter of the specified step (as determined in S119). Control then proceeds to step S123. In step S123, the control section 6005 delivers the created sub-group information to the flow management section 6003 and stores the information in a table containing sub-group information (to be described later) to be managed by the flow management section 6003.

FIG. 10 is a flowchart describing the process of specifying a corresponding workflow upon designation of parameter information.

The processing shown in FIG. 10 is started in response to the control section 6005 calling the parameter determination section 6002. First, in step S201, the control section 6005 delivers the recognized parameter information to the parameter determination section 6002. In response, the parameter determination section 6002 sends back to the control section 6005 an indication that the parameter information has been recognized. Next, in step S202, the control section 6005 acquires all items of information being managed by the parameter information managed by the flow management section 6003, and the control section 6005 recognizes this acquired parameter information. Next, in step S203, the control section 6005 requests the parameter determination section 6002 to execute loop processing between this step and step S206 with regard to all items of parameter information acquired in step S202. Next, in step S204, the control section 6005 requests the parameter determination section 6002 to determine whether or not the recognized parameter information is equal to the specified parameter information. If the parameter determination section 6002 determines that these items are equal, control proceeds to step S205. Here the control section 6005 stores the specified parameter information, which is the result of the determination, in the temporary storage area and continues the loop. On the other hand, when it is found in step S204 that the two items are not equal, the loop is continued.

FIG. 11 is a flowchart describing the flow of processing for specifying a corresponding workflow upon designation of a sub-group parameter by the parameter determination section 6002.

The processing shown in FIG. 11 is started in response to the control section 6005 calling the parameter determination section 6002. First, in step S301, the control section 6005 delivers the recognized parameter information of the sub-group to the parameter determination section 6002. In response, the parameter determination section 6002 sends back to the control section 6005 an indication that the parameter information of the sub-group has been recognized. Next, in step S302, the control section 6005 acquires all items of parameter sub-group information being managed by the flow management section 6003, and the control section 6005 recognizes this acquired parameter sub-group information. Next, in step S303, the control section 6005 requests the parameter determination section 6002 to execute loop processing between this step S303 and step S306 with regard to all items of recognized parameter sub-group information.

In step S304, the control section 6005 requests the parameter determination section 6002 to determine whether or not the recognized parameter information of the sub-group is equal to the specified parameter sub-group information. If the parameter determination section 6002 determines that these items are equal, control proceeds to step S305. Otherwise, the loop is continued. In step S305, the control section 6005 stores the specified parameter sub-group information, which is the result of the determination, in the temporary storage area and proceeds to the loop of step S306.

When processing regarding all of the acquired parameter sub-group information ends, control proceeds to step S307. Here the control section 6005 acquires all items of parameter information managed by the flow management section 6003 and recognizes the acquired parameter information. Next, in step S308, the control section 6005 executes loop processing between this step S308 and step S314 with regard to all items of sub-group information stored in step S305. In step S308, information regarding a sub-group is acquired from the sub-group information generated in step S122 (FIG. 9). Then, in step S309, the control section 6005 executes loop processing between this step S309 and step S313 with regard to all items of parameter information acquired in step S303. Control then proceeds to step S310, at which the control section 6005 requests the parameter determination section 6002 to determine whether or not the ID of the workflow associated with the specified sub-group is equal to the ID of the workflow associated with the specified parameter information. In other words, the ID of the sub-group (specified sub-group) and ID of parameter information are compared. If the parameter determination section 6002 determines that IDs are equal, control proceeds to step S311. Otherwise, the loop is continued. In step S311, the control section 6005 requests the parameter determination section 6002 to determine whether or not the start parameter of the specified sub-group is equal to the start parameter of the specified parameter information. In other words, if the ID of sub-group is identical with the ID of the parameter information, in S311, it is determined whether or not a start parameter of the sub-group is identical with a start parameter of the parameter information. If they are identical, then the parameter information is linked with the specified sub-group. The parameter determination section 6002 sends the result of the determination back to the control section 6005. If the start parameters are determined to be equal, control proceeds to step S312. Otherwise, the loop is continued. In step S312, the control section 6005 stores the specified parameter information, which is the result of the determination, in the temporary storage area.

FIG. 12 is a diagram illustrating an example of a flow information management table managed by the flow management section 6003 according to this embodiment.

Items included in the table of FIG. 12 are workflow ID 1301, workflow type 1302, order (sequence) 1303 of steps in which workflow is executed, and name 1304 of the function provided in the step. This table places the above-mentioned information in table form for the purpose of managing the workflow information. The utilization purpose of each item is as set forth below.

The workflow ID 1301 is a sequential unique ID of the workflow. This ID is defined uniquely on a per-workflow basis. The workflow type 1302 is a field indicating flow types such as the main flow 7001 and the subflow 7002 shown in FIG. 6. The order 1303 in which steps are executed is a field that specifies the sequence of processing within the same workflow. The name 1304 of the function provided by the step is a field indicating the name of the function of each step within the same workflow.

FIGS. 13A and 13B are diagrams describing an example of a parameter management table managed by the flow management section 6003 according to this embodiment.

The items of this table are workflow ID 1401, order 1402 of steps in which the workflow is executed, start parameter 1403 and end parameter 1404. This table is for the purpose of managing the parameter information in each step in the same workflow.

The workflow ID 1401 is similar to the workflow ID 1301 in FIG. 12. The order 1402 of steps in which the workflow is executed is similar to the order 1303 of steps in which the workflow is executed in FIG. 12. The start parameter 1403 is a field that describes parameter information necessary when a step starts to be executed. The end parameter 1404 is a field that indicates parameter information sent back when execution of a step ends.

FIG. 14 is a diagram describing an example of a sub-group parameter management table managed by the flow management section 6003 according to this embodiment.

The items of the table shown in FIG. 14 are sub-group ID 1501, sub-group name 1502, start parameter 1503 and workflow ID 1504. This table is for the purpose of managing information relating to sub-groups.

Sub-group ID 1501 is a sequential unique ID of a sub-group. Sub-group name 1502 is a field representing the name of a sub-group. Start parameter 1503 is similar to the start parameter 1403 of FIGS. 13A and 13B. Workflow ID 1504 is similar to the workflow ID 1301 of FIG. 12.

Figure 15A:
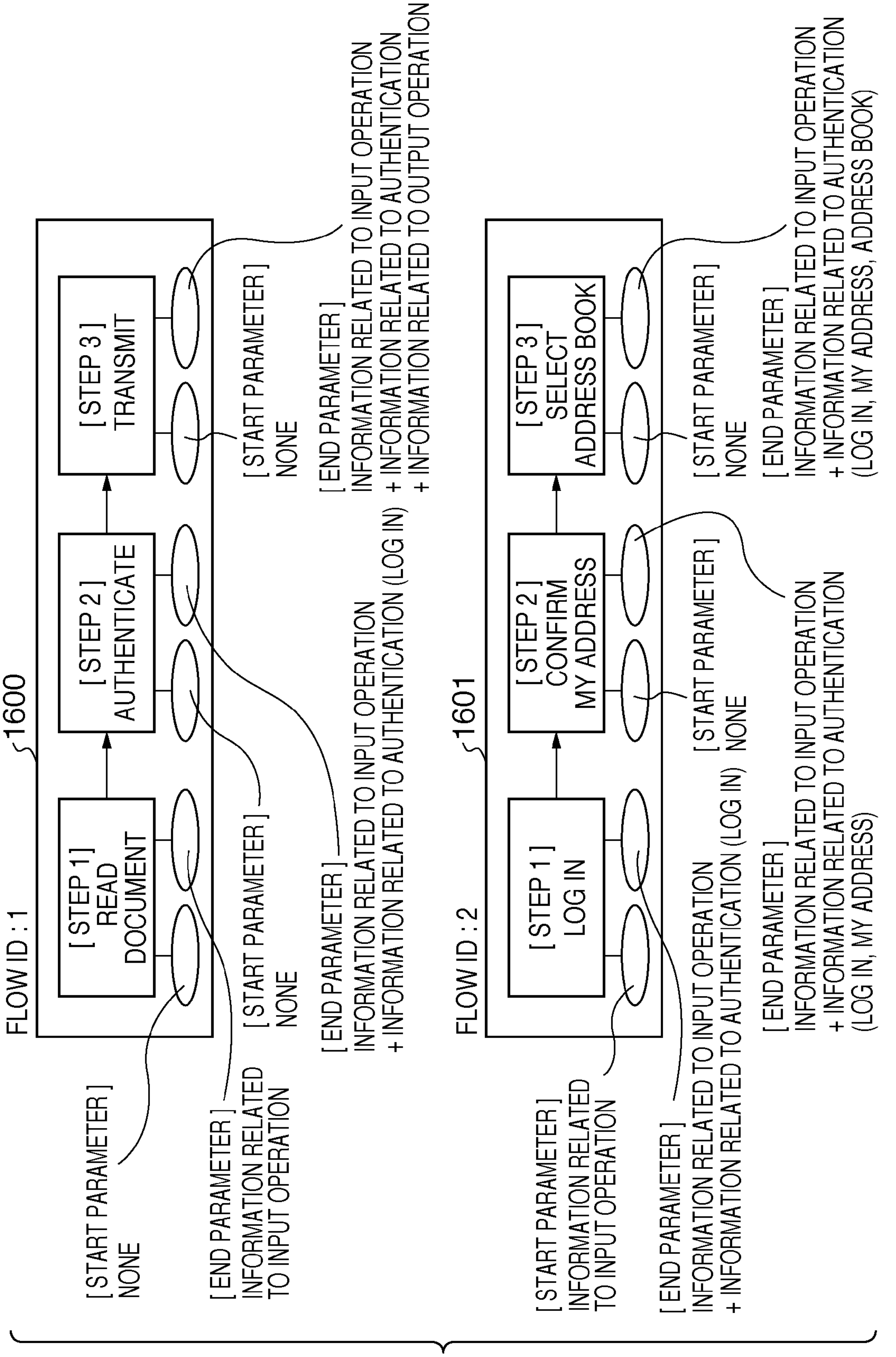
FIGS. 15A and 15B depict conceptual views for describing processing by a flow modification program.
Figure 15B:
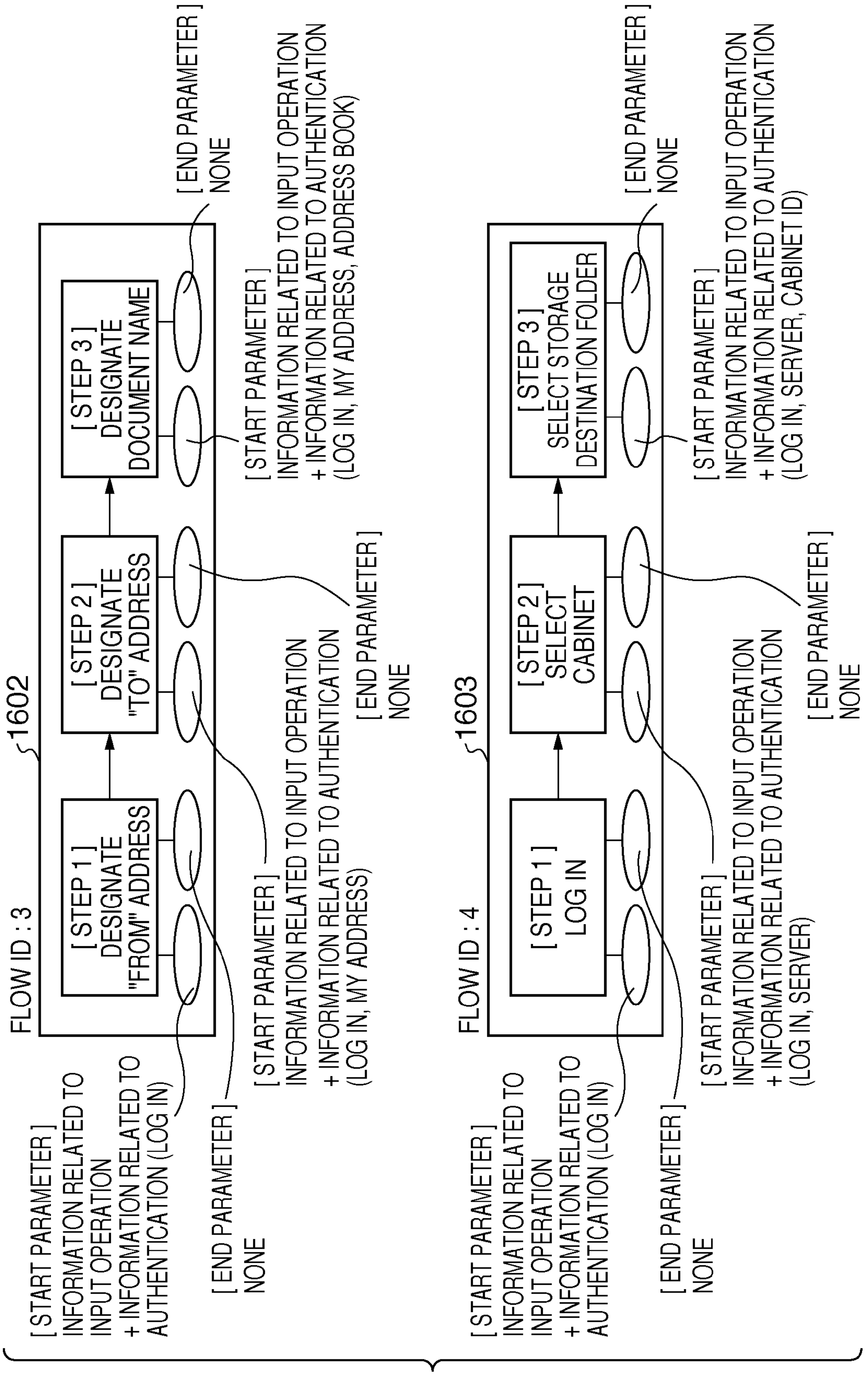

FIGS. 15A and 15B depict conceptual views useful in describing processing by a flow modification program. This will be described based upon an example using the tables set forth in FIGS. 12, 13 and 14.

Shown in FIGS. 15A and 15B are a main flow (flow ID=1) 1600, which is the same as the main flow 7001 of FIG. 6; a subflow (flow ID=2) 1601, which is similar to the subflow 7002 of FIG. 6; a subflow (flow ID=3) 1602, which is similar to the subflow 7003 of FIG. 6; and a subflow (flow ID=4) 1603, which is a processing pattern separate from subflow 1602.

It will be assumed in this embodiment that an administrator or creator registers workflow information concerning the main flow 1600, subflow 1601, subflow 1602 and subflow 1603. When the information is registered, the main flow 1600, subflow 1601, subflow 1602 and subflow 1603 are delivered to the flow registration section 6001, thereby completing the registration of the data. The flow registration section 6001 calls the processing of steps S101 to S112 of FIG. 8 (to store main flow parameter information) or the processing of steps S113 to S124 of FIG. 9 (to store subflow parameter information), thereby generating information registered in the flow management section 6003. The flow management section 6003 registers the generated registration information in step S112 or S123, thereby creating the data of the tables shown in FIGS. 12, 13 and 14.

By delivering the above-mentioned workflow to the flow registration section 6001, as described above, registration of the data of this workflow is completed. As a result, labour involved in creation and management is reduced compared to an administrator having to input all possible workflows. As can be seen from FIGS. 15A and 15B, an end parameter in one of the steps (step 1) of the main flow 1600 becomes the start parameter of a step (step 1) in a subflow (1601). This is how it is recognized that a subflow (1601) is to be started subsequent to a step in the main flow (1600). By way of further example, the first step (step 1) of the second subflow (1602) has as a start parameter with the same information (INFORMATION RELATED TO INPUT OPERATION+INFORMATION RELATED TO AUTHENTICATION) as the end parameter of the first step (step 1) of the first subflow (1601), and so on. Thus, subsequent steps (step 1, step 2, step 3 of the main flow) within the same workflow will occur automatically, while ending specific steps in each workflow may cause the calling of a first step in a subflow, thereby setting off that subflow. Thus, an overall workflow may be initiated as shown in FIG. 16.

Figure 16:
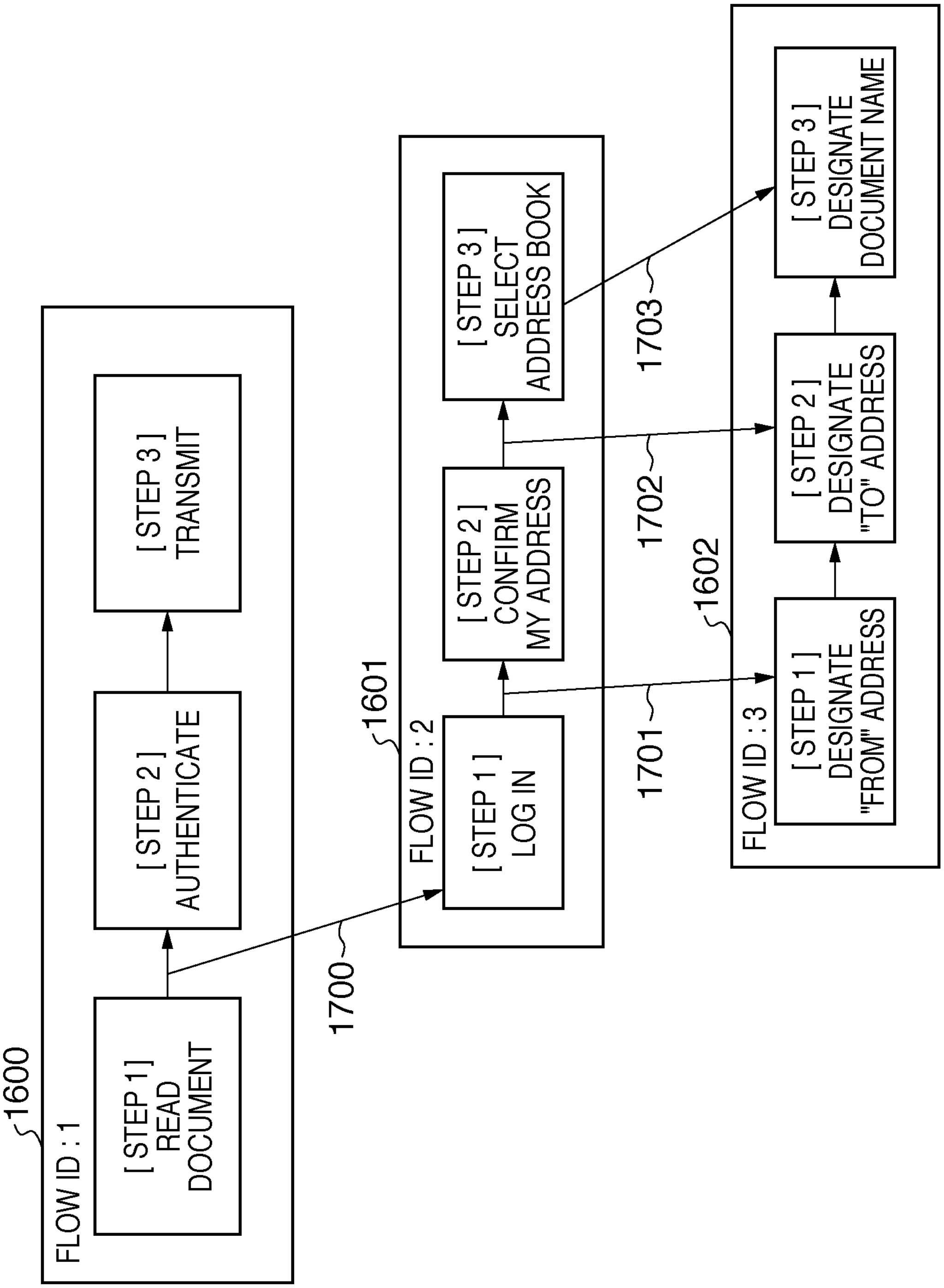
FIG. 16 depicts a conceptual view of a process pattern of a workflow supplied when the workflow is executed.

FIG. 16 depicts a conceptual view of a process pattern of a workflow supplied when the workflow is executed by utilizing a function for specifying the workflow provided by the parameter determination section 6002 having the flow modification program according to this embodiment.

While acquiring information from the flow providing section 6004, the parameter determination section 6002 performs the parameter determination set forth below.

(1) A Case where the Transition is Indicated by 1700.

(Determination 1—What is the Completed Step?)

The completed step of the main flow 1600 is Step 1 [READ DOCUMENT] of the main flow (flow ID=1). Accordingly, in view of FIG. 15A, the end parameter of [READ DOCUMENT] is [INFORMATION RELATED TO INPUT OPERATION].

(Determination 2—What is Next Step?)

The step executed next is a step where the start parameter is [INFORMATION RELATED TO INPUT OPERATION]. Accordingly, in view of FIG. 15A:

(Determination Result)

The start parameter of Step 1 [LOG IN] of the subflow (flow ID=2) is [INFORMATION RELATED TO INPUT OPERATION], and therefore it is determined that this is the applicable step (this is stored in step S205 of FIG. 10).

(2) A Case where the Transition is as Indicated by 1701.

(Determination 1—What is the Completed Step?)

The completed step of the subflow 1601 is Step 1 [LOG IN] of the subflow (flow ID=2). Accordingly, in view of FIG. 15A, the end parameter of this Step 1 [LOG IN] is [INFORMATION RELATED TO INPUT OPERATION+INFORMATION RELATED TO AUTHENTICATION (LOG IN)].

(Determination 2—What is Next Step?)

Accordingly, the next step is a step where the start parameter is [INFORMATION RELATED TO INPUT OPERATION+INFORMATION RELATED TO AUTHENTICATION (LOG IN)].

(Determination Result)

In view of FIG. 15B, Step 1 [DESIGNATE "FROM" ADDRESS] of the subflow (flow ID=3) is determined as the applicable step (this is stored in step S205 of FIG. 10).

(3) A Case where the Transition is as Indicated by 1702.

(Determination 1—What is the Completed Step?)

The completed step of the subflow 1601 is Step 2 [CONFIRM MY ADDRESS] of the subflow (flow ID=2). The end parameter of this Step 2 [CONFIRM MY ADDRESS] is [INFORMATION RELATED TO INPUT OPERATION+INFORMATION RELATED TO AUTHENTICATION (LOG IN, MY ADDRESS)] in view of FIG. 15A.

(Determination 2—What is Next Step?)

The next step is a step where the start parameter is [INFORMATION RELATED TO INPUT OPERATION+INFORMATION RELATED TO AUTHENTICATION (LOG IN, MY ADDRESS)]. Step 2 [DESIGNATE "TO" ADDRESS] of the subflow (flow ID=3; FIG. 15B) is the applicable step (this is stored in step S205 of FIG. 10).

(4) A Case where the Transition is as Indicated by 1703.

(Determination 1—What is the Completed Step?)

The completed step of the subflow 1601 is Step 3 [SELECT MY ADDRESS BOOK] of the subflow (flow ID=2). Accordingly, the end parameter of this step is [INFORMATION RELATED TO INPUT OPERATION+INFORMATION RELATED TO AUTHENTICATION (LOG IN, MY ADDRESS, ADDRESS BOOK)] in view of FIG. 15A.

(Determination 2—What is Next Step?)

Accordingly, the start parameter of the next step is [INFORMATION RELATED TO INPUT OPERATION+INFORMATION RELATED TO AUTHENTICATION (LOG IN, MY ADDRESS, ADDRESS BOOK)]. In view of FIG. 15B, Step 3 [DESIGNATE DOCUMENT NAME] of the subflow (flow ID=3) is the applicable step (this is stored in step S205 of FIG. 10).

Thus, by comparing the end parameter of a completed step and the start parameter of each step of a subflow, the step to be executed following the completed step can be specified.

<A Case where the Parameter of Sub-Group Information is Designated>

FIG. 17 depicts a conceptual view in which workflows are grouped and supplied from the parameter determination section 6002 of the flow modification program according to this embodiment.

The parameter determination section 6002 performs the parameter determination set forth below.

As sub-group information provided when the transition indicated at 1800 is executed:

(Determination 1) The completed step is Step 2 (AUTHENTICATE) of the main flow (flow ID=1). Accordingly, the end parameter of this step is [INFORMATION RELATED TO INPUT OPERATION+INFORMATION RELATED TO AUTHENTICATION (LOG IN)] in view of FIG. 15A.

(Determination 2) The step to be executed next is a step where the start parameter of the subflow is [INFORMATION RELATED TO INPUT OPERATION+INFORMATION RELATED TO AUTHENTICATION (LOG IN)].

(Determination Result) The flow (ID=3) and the flow (ID=4) of the sub-group ID (ID=Sub-1) are applicable (this is stored in step S205 of FIG. 10).

As flow information provided when the transitions indicated by 1801 and 1802 are executed:

(1) A Case where the Transition is as Indicated by 1801.

(Determination 1—What is the First Step?)

The flow (ID=3) is selected by the parameter sub-group information. The start parameter is INFORMATION RELATED TO INPUT OPERATION+INFORMATION RELATED TO AUTHENTICATION (LOG IN).

(Determination 2 What is Next Step?)

Since the start parameter of the next step is INFORMATION RELATED TO INPUT OPERATION+INFORMATION RELATED TO AUTHENTICATION (LOG IN), Step 1 [DESIGNATE "FROM" ADDRESS] of the subflow (flow ID=3) is the applicable step (this is stored in step S312 of FIG. 11).

(2) A Case where the Transition is as Indicated by 1802.

(Determination 1—What is the First Step?)

The flow (ID=4) is selected by the parameter sub-group information. The start parameter is INFORMATION

RELATED TO INPUT OPERATION+INFORMATION RELATED TO AUTHENTICATION (LOG IN).

(Determination 2—What is Next Step?)

Since the start parameter of the next step is INFORMATION RELATED TO INPUT OPERATION+INFORMATION RELATED TO AUTHENTICATION (LOG IN), Step 1 [LOG IN] of the subflow (flow ID=4) is the applicable step in view of FIG. 15B (this is stored in step S312 of FIG. 11).

In accordance with this embodiment, as described above, subsequent parameters can be decided sequentially, and a workflow created automatically, in accordance with selection of a parameter at each step based upon a provided workflow and a workflow that has been registered.

The result of such an arrangement is a reduction in labour involved in creating a workflow by selecting desired workflows from among a number of workflows created and provided beforehand by an administrator or creator.

Further, in a case where a plurality of candidates for a workflow to be executed next exist, these are provided as a list of grouped candidates. This enables a reduction in the labour involved in selecting desired workflows from among a number of workflow candidates.

Further, in accordance with this embodiment, since registration of data is completed by an administrator or creator delivering each workflow to the flow registration section 6001, the labour involved in creation and management is reduced. Further, since a workflow to be executed next is provided automatically at the time of execution to the user who executes the workflow, the labour involved in making a selection from a plurality of workflow candidates is reduced. Furthermore, in a case where a plurality of candidates for a workflow to be executed next exist, these are provided as a list of grouped candidates. This enables a reduction in the labour involved in selecting desired workflows from among a number of workflow candidates and enhances user convenience.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-063232, filed Mar. 16, 2009 that is hereby incorporated by reference herein in its entirety.

What is claimed is:

1. An information processing apparatus that performs a workflow having a plurality of steps, the apparatus comprising:

a processor; and a memory device storing a program that, when executed, causes the apparatus to:

register the workflow having the plurality of steps;

manage a plurality of start parameters and a plurality of end parameters, each start parameter indicating a condition for starting each step included in the workflow, and each end parameter being generated at an end of each step; and determine a second step that follows a first step based on the end parameter of the first step that is generated when the first step ends and the start parameters that are managed;

wherein the apparatus appends a unique identifier to the workflow; and wherein the apparatus manages parameter information including workflow identifiers, orders of steps in which workflows are performed, start parameters and end parameters.

2. The apparatus according to claim 1, wherein the apparatus registers a plurality of items of parameter information for each step, and manages an order in which the plurality of items of parameter information for each step are used.

3. The apparatus according to claim 1, wherein the apparatus manages a flow information management table obtained by tabulating workflow identifiers, workflow types, orders of steps in which workflows are performed, and names of functions provided in each step.

4. The apparatus according to claim 1, wherein the apparatus manages a parameter sub-group information management table, wherein a sub-group of at least one step within the workflow, the parameter sub-group information management table being obtained by tabulating sub-group identifiers, sub-group names, start parameters and workflow identifiers.

5. A method of controlling an information processing apparatus that performs a workflow having a plurality of steps, the method comprising:

registering the workflow having the plurality of steps;

managing a plurality of start parameters and a plurality of end parameters, each start parameter indicating a condition for starting each step included in the workflow, and each end parameter being generated at an end of each step; and determining a second step for following a first step based on the start parameters that are managed and the end parameter of the first step that is generated when the first step ends;

wherein the apparatus appends a unique identifier to the workflow; and wherein the apparatus manages parameter information including workflow identifiers, orders of steps in which workflows are performed, start parameters and end parameters.

* * * * *